United States Patent Office 3,823,051
Patented July 9, 1974

3,823,051
B-STAGE POLYURETHANE COMPOSITIONS
Wen-Hsuan Chang, Gibsonia, Pa., assignor to
PPG Industries, Inc., Pittsburgh, Pa.
No Drawing. Application May 6, 1970, Ser. No. 35,286,
which is a continuation-in-part of abandoned application Ser. No. 746,739, July 23, 1968. Divided and this
application June 20, 1972, Ser. No. 264,656
Int. Cl. B32b 17/10, 27/40
U.S. Cl. 156—99                           5 Claims

ABSTRACT OF THE DISCLOSURE

Curable B-stage polyurethanes suitable for use as interlayers for glass laminates comprise the reaction product of at least one hydroxy-containing ester having a terminal acrylyl or substituted-acrylyl group, an organic diisocyanate and a polyol. The compositions are stable at room temperature even when containing a free radical-producing initiator but cure in the presence of free radicals to a hard, thermoset state. The preferred diisocyanates include isocyanato-terminated polyether adducts of poly(oxypolymethylene) glycols.

CROSS-REFERENCE TO RELATED APPLICATION

This is a division of application Ser. No. 35,286, filed May 6, 1970, now abandoned, which application is a continuation-in-part of copending application Ser. No. 746,739, filed July 23, 1968, now abandoned.

BACKGROUND OF THE INVENTION

Glass laminates, i.e. laminates of plates or sheets of glass bonded to an interlayer material, are widely used in glass areas of automobiles, aircraft and the like, as well as in certain architectural applications. For the most part, such glass laminates are made using polyvinyl butyral in sheet form as the interlayer material and they are produced using high temperatures and high pressure laminating techniques. Not only are such laminating techniques difficult and cumbersome, but the thermoplastic interlayers, such as polyvinyl butyral, employed therein often do not meet the level of performance which is desired to provide optimum safety during use of the article.

Other types of interlayer materials have been developed which provide safety glass of highly desirable characteristics and which can be applied by other methods, such as by a cast-in-place procedure. However, such materials have also been subject to certain disadvantages including the need for rigid control of the casting process because of the short pot life of the materials employed.

The present invention overcomes these difficulties by the use of an easily handled resinous polyurethane which provides a glass laminate of suitable properties but which can be utilized by procedures analogous to those employed with the thermoplastic materials of the prior art, but which in many cases avoids the need for severe laminating conditions.

Hydroxyalkyl esters of unsaturated acids have been employed in polyurethane compositions heretofore. For example, polymers and copolymers of hydroxyalkyl acrylates and methacrylates have been reacted with polyisocyanates to produce polyurethanes for castings, coatings, and the like. However, such reaction products differ from those herein in that they are fully cured reaction with the polyisocyanate and thus are subject to the same disadvantages, such as short pot life, which are encountered with the other materials suggested for cast-in-place applications heretofore.

BRIEF SUMMARY OF THE INVENTION

The invention herein provides durable B-stage resinous polyurethanes which comprise the reaction product of one or more hydroxyl-containing esters having a terminal acrylyl or alpha-substituted acrylyl group with an organic diisocyanate and a polyol. The reaction product is an ungelled material corresponding to the formula (I) 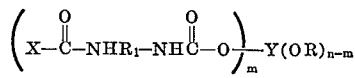

where X is the radical derived by removing a hydroxyl hydrogen atom from the hydroxyl-containing ester having a terminal acrylyl or alpha-substituted acrylyl group, $R_1$ is a divalent organic radical, R is hydrogen or an organic group containing urethane linkages, Y is a radical derived by removing the hydroxyl groups from a polyol having $n$ hydroxyls, $n$ is a number greater than one and up to about 8, and $m$ is a number greater than one and up to about 4.

This product can be further cured to a hard, thermoset state in the presence of free radicals such as are produced by heating to high temperatures, or more usually, by the use of free radical initiators. The composition may include a peroxide or other free radical initiator and such mixtures are stable at temperatures up to the temperature at which the initiator decomposes to produce free radicals.

DETAILED DESCRIPTION OF THE INVENTION

As stated above, the invention comprises the reaction product of three essential components, namely, one or more hydroxyl-containing esters having a polymerizable ethylenic group, an organic diisocyanate, and a polyol.

The ester component can be any monomeric ester or polyester containing at least one hydroxyl and a terminal acrylyl or alpha-substituted acrylyl group. Useful monomeric esters include hydroxyalkyl esters of acrylic acid or alpha-substituted acrylic acids, such as methacrylic acid and alpha-chloroacrylic acid. Especially preferred esters are acrylic acid and methacrylic acid esters of ethylene glycol, i.e. hydroxyethyl acrylate and methacrylate and hydroxypropyl acrylate and methacrylate. However, there may also be employed similar esters of alpha-substituted acrylic acids, such as ethacrylic acid, crotonic acid and similar acids having, for example, up to about 6 carbon atoms, as well as corresponding esters containing other hydroxyalkyl radicals, such as hydroxybutyl esters and hydroxylauryl esters.

Also useful are substituted hydroxyalkyl esters of the above unsaturated acids, such as, for example, 1-acryloxy-3-phenoxy-2-propanol, which can be produced by reacting phenyl glycidyl ether with acrylic acid. Other compounds of this type and other substituted hydroxyalkyl esters, such as, for example, hydroxyalkyl acryloxyalkyl phthalates or maleates, can also be utilized.

Hydroxyl-containing polyesters having terminal acrylyl or alpha-substituted acrylyl groups are also included. These can be produced, for example, by reacting one mole of acrylic or methacrylic acid with two moles of a dicarboxylic acid, such as adipic acid, azelaic acid, or other such acid, and three moles of a diol such as ethylene glycol, 1,4-butanediol, or the like. Similar polyesters can be produced using other such reactants in varying proportions, so long as a substantially linear product having residual hydroxyls and an acrylyl or substituted acrylyl group is provided.

The organic diisocyanate which is reacted with the ester component can be essentially any diisocyanate, i.e., hydrocarbon or substituted hydrocarbon diisocyanates and isocyanato-terminated adducts of polyols. Many such organic diisocyanates are known in the art.

Among the organic diisocyanates which can be employed are arylene diisocyanates, such as p-phenylene diisocyanate, diphenyl diisocyanate and the like; alkarylene diisocyanates, such as toluene diisocyanate, 3,3'-dimethyl- 4,4'-biphenylene diisocyanate and the like; alkylene diisocyanates, for example, 1,4-tetramethylene diisocyanate, hexamethylene diisocyanate, 2,2,4-trimethylhexane 1,6-diisocyanate, etc.; aralkylene diisocyanates, such as methylenebis(phenylisocyanate); and alicyclic diisocyanates, for example, isophorone diisocyanate and methylcyclohexyl diisocyanate.

Other diisocyanates that can be employed are isocyanato-terminated adducts of diols such as ethylene glycol, 1,4-butylene glycol, polyoxyalkylene glycols, etc. These are formed by reacting two moles of a diisocyanate, such as those mentioned above, with one mole of a diol.

One preferred class of organic diisocyanates comprises prepolymers produced from an organic diisocyanate such as toluene diisocyanate with a poly(oxypolymethylene) glycol. Representative poly(oxypolymethylene) glycols of this group contain oxypolymethylene groups in which a linear chain of from about 2 to about 6 carbon atoms separate each adjacent pair of oxygen atoms. Preferred are poly(oxytetramethylene) glycols. Other polyether glycols, such as poly(oxypentamethylene) glycols and poly(oxyhexamethylene) glycols, can also be used but are usually less desirable as a class, as are branched carbon chain compounds. It is desirable that the poly(oxypolymethylene) glycol have a molecular weight between about 100 and about 4000, although the optimum molecular weight varies with the particular system and the intended use for the product.

Other useful diisocyanates include isocyanato-terminated adducts produced from polyesters polyols, such as adducts of various saturated and unsaturated polyester polyols made from esterification of polyols and dibasic acids and containing unreacted hydroxyl groups. An example is the reaction product of toluene diisocyanate with a polyester formed from propylene glycol and adipic acid. Such polyester adducts are well-known and are utilized in the manufacture of conventional types of polyurethane products.

In many cases, more than one diisocyanate is employed; for example, toluene diisocyanate or other low molecular weight diisocyanate is often added along with an isocyanato-terminated prepolymer, or several prepolymers of varying molecular weights are used. This permits formulation of the product to provide a desired level of hardness, flexibility and similar properties.

The polyol which is employed can be any monomeric or polymeric polyol having an average of more than one hydroxyl group and up to about 8 hydroxyls per molecule. Useful polyols include ethylene glycol, 1,4-butanediol, 1,6-hexanediol and other alkylene glycols, glycerine, sorbitol, cyclohexane dimethanol, hydrogenated Bisphenol A, and the like, as well as polymeric polyols, including polyether polyols such as poly(oxypolymethylene) glycols, oxyalkylated sucrose or other polyol, copolymers of allyl alcohol and styrene, hydroxyl-containing epoxy resins or epoxy esters, polyesters having free hydroxyls, and the like. In many cases a mixture of polyols is utilized.

Optional ingredients which can be included in the overall composition include small amounts of higher polyols; chain transfer agents, such as mercaptans; small amounts of monohydric alcohols, including in some cases a hydroxyalkyl ester of a saturated carboxylic acid; copolymerizable monomers, such as styrene, acrylates, etc. and other additives such as inhibitors, antioxidants, stabilizers and the like.

The components are combined in proportions chosen so as to avoid gellation of the product, i.e. to provide an ungelled product which is substantially linear. The proportions employed depends upon considerations well known to those in the art, such as the funcitonality of the particular reactants and their reactivity with each other. The number of isocyanate groups should be not greater than the total number of hydroxyl groups present, and preferably the diisocyanate is employed in an amount which provides substantially equivalent amounts of hydroxyl and isocyanato groups. The diisocyanate reacts in part with the polyol and in part with the hydroxyl group of the ester; in some cases the isocyanate may react with excess hydroxyls of the polyol to provide a coupled product.

The reaction to produce the B-stage polyurethane takes place upon admixture of the components, although moderate heating is generally utilized in order to insure complete reaction within a reasonable period. In some instances, such as when an aliphatic diisocyanate is employed, a catalyst is desirable to promote the urethane-forming reaction. Dibutyltin dilaurate, zinc octoate and the like are examples. Temperatures below about 150° C. are ordinarily employed. The product is a B-stage resin which can be easily handled and which is essentially thermoplastic, provided the curing conditions as described below are not encountered. Thus, it can be heated to a fluid state and cast or spread upon a substrate, or it can be employed in coatings in solution or as a solventless coating material.

The B-stage polyurethane produced in the foregoing manner has the major resinous component product corresponding generally to the average formula (I)

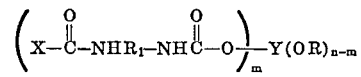

In the above formula, X is an organic radical formed by removing a hydroxyl hydrogen atom from an ester containing an acrylyl or alpha-substituted acrylyl group and at least one hydroxyl group. The radical represented by X is the residue of the ester component described above after reaction of the hydroxyl group, and thus can be derived from any of the monomeric esters or polyesters described.

In the peferred embodiment in which the ester employed is a hydroxyalkyl ester of an acrylic acid, the product has the average formula (II)

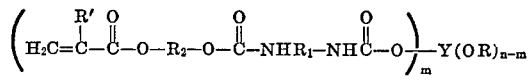

where R' is hydrogen or lower alkyl, e.g., methyl, and $R_2$ is an alkylene or substituted alkylene of at least 2 carbon atoms, derived from the hydroxyalkyl group of the ester. The group represented by $R_2$ may be an alkylene group substituted with alkoxy, aryloxy, oxyalkylene and other such groups.

In the embodiment in which an acrylyl-terminated hydroxyl-containing polyester is utilized, the product has the formula (III)

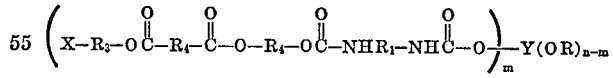

where $R_3$ is an alkylene or oxyalkylene group such as those represented by $R_2$, and $R_4$ is a divalent organic radical, such as alkylene, arylene, or alkenylene, or a polyester moiety. Products of this type are produced, for example, by employing as the ester component a reaction product of one mole of hydroxyethyl acrylate, one mole of phthalic anhydride and one to two moles of ethylene oxide, or the product from the reaction of one mole of methacrylic acid, two moles of adipic acid and three moles of 1,6-hexanediol.

The group represented by $R_1$ in the above formulas is derived from the diisocyanate and thus can be essentially any divalent organic radical. For example, $R_1$ can be arylene, alkylene, alkarylene, aralkylene, alicyclic, oxyalkylene, etc., including halogen or other substituted groups, depending upon the organic diisocyanate employed, as illustrated by the varied types of diisocyanates mentioned above. In many cases the polyurethane is chain-extended and contains urethane linkages.

The radical represented by Y is the residue of the polyol without the hydroxyl groups, and thus also can be of widely varying structures. As indicated by the polyols described above, Y can be monomeric or polymeric and can be of essentially any organic structure which can have hydroxyl groups attached thereto.

As described above, Y is derived from a polyol having $n$ hydroxyl groups, where $n$ is a number greater than one and up to about 8. Since the formula given is an average formula, and a mixture of polyols can be utilized, $n$ can be a whole or fractional number.

In producing the curable polyurethane, the number of polyurethane groups terminated with radicals containing acrylyl or substituted acrylyl groups is greater than one but not more than about 4 (designated by $m$). The remaining hydroxyls of the polyol, if any, are represented by —OR, where R is hydrogen if the hydroxyls remain unreacted or a urethane-containing organic radical where the hydroxyl is reacted with a diisocyanate, which may be the same or different as that used to produce the X-terminated groups. The groups represented by R, however, do not contain an acrylyl or substituted acrylyl group as does that represented by X.

The B-stage product described above is resinous but remains thermoplastic; it cures by addition polymerization in the presence of free radicals to a hard, thermoset state. The free radicals can be provided by a free-radical producing initiator which can be included in the polyurethane composition as formed, or which can be added at a later time. Such initiators are most often organic peroxides such as di(tertiary-butyl) peroxide, which is a preferred initiator, cumene hydroperoxide, dicumyl peroxide, peracetic acid, methylethyl ketone peroxide, benzoyl peroxide and the like. Other free radical-producing initiators, such as azo compounds, e.g., alpha, alpha'-azobis(isobutyronitrile) or p-methoxyphenyl-diazothio(2-naphthyl)ether, can also be utilized. In addition to curing of the product by the inclusion of free radical initiators, curing can also be effected by other means, for instance by heating to sufficiently high temperatures, or by irradiation using an electron beam or ultra-violet light.

Using peroxides or other free radical producing initiator, the curing is carried out at temperatures sufficient to provide free radicals from decomposition of the initiator at a reasonable rate. In the case of di(tertiarybutyl) peroxide, for example, the products generally cure at from 200 to 400° F. Where a free radical-initiator such as a peroxide is utilized, the amount is usually at least about 0.01 percent of the overall composition and is generally within the range of from about 0.01 percent to about 3 percent.

Safety glass laminates are produced by applying the B-stage material to at least one layer of glass and curing the B-stage material while in contact with the glass. The type of glass employed is not critical and can be of any composition to provide the desired optical and strength properties. Conventionally, two or more layers of glass are bonded together using these materials as the interlayers, but laminates can also be produced using a single layer of glass or using one or more glass layers together with one or more layers of hard, transparent plastic material. Acylic polymers such as poly(methyl methacrylate) and polycarbonates such as those described in U.S. Pat. 3,117,009 are suitable plastic materials. The laminates produced are strong and clear and have those properties necessary for an acceptable glass including excellent adhesion, high impact resistance, clarity and the like.

The invention will be further described by reference to several examples which follow. These examples are illustrative and should not be construed so as to limit the invention to their details. All parts and percentages are by weight unless otherwise specified. Where toluene diisocyanate is employed in the examples there was used the ordinary commercial mixture of 80 percent 2,4-isomer and 20 percent 2,6-isomer.

Example 1

In this example, there were employed two prepolymers made from poly(oxytetramethylene) glycols and toluene diisocyanate; Prepolymer A is produced from a glycol having a molecular weight of about 954 and has a molecular weight of about 1320 and an NCO content of about 6.4 percent, and Prepolymer B is made from a glycol having a molecular weight of about 522 and has a molecular weight of about 870 and an NCO content of about 9.34 percent.

The following were mixed in a reaction vessel:

| | Parts by weight |
|---|---|
| Prepolymer A | 222.3 |
| Prepolymer B | 31.8 |
| Toluene diisocyanate ("Hylene TM") | 45.9 |
| Substituted benzotriazole U.V. light absorber ("Tinuvin P") | 0.3 |
| Methyl acid phosphate | 0.3 |

This mixture was heated to 125° F. and stirred under vacuum to remove dissolved gases. A second mixture of the following composition was similarly degassed at room temperature:

| | Parts by weight |
|---|---|
| 1,4-Butanediol | 39.6 |
| 2-Hydroxyethyl acrylate | 6.0 |
| Di(tertiary-butyl) peroxide | 0.06 |

The second mixture was added to the reaction vessel and stirred for 5 minutes; the temperature rose from 125° F. to 182° F. The mixture was then poured into a casting cell made of two 12 inch by 12 inch Teflon coated glass plates spaced 60 mils apart with a silicone gasket and spacer around the periphery. The casting cell was preheated to 200° F.; the filled cell was heated at 200° F. for 4 hours and cooled. The product was a clear, transparent strong sheet having a Shore "A" hardness (room temperature) of 58; it has excellent storage stability. This sheet was employed in making a safety glass laminate by placing it between two 12 inch by 12 inch sheets of ⅛ inch thick plate glass, and laminating the assembly in an autoclave at 265° F. and 200 p.s.i. for 30 minutes. The laminate obtained had good optical and strength properties; for example, its impact resistance, as measured by dropping a five-pound steel ball onto laminates prepared using the above formulation as the interlayer from various heights to determine the maximum height from which the ball does not pass through the laminate, was 4 feet at 0° F. and 7 feet at 120° F.

Example 2

Following the procedure of Example 1, a B-stage resin was produced from the following:

| | Parts by weight |
|---|---|
| Prepolymer A | 824.6 |
| Toluene diisocyanate | 175.4 |
| Substitued benzotriazole ("Tinuvin P") | 1.0 |
| 1,4-Butanediol | 135.8 |
| 2-Hydroxyethyl acrylate | 20.0 |
| Di(t-butyl) peroxide | 0.2 |

The thermoplastic sheet obtained (about ¼ inch thick) was cut into strips approximately ½ inch wide and extruded through a ¾ inch extruder fitted with a 2½ inch by 0.020 inch film die at a screw speed of 20 r.p.m. and an average temperature of about 190° F. The resin extruded satisfactorily to a slightly cloudy sheet 35 mils thick at the edges and 41 mils thick in the center. This sheet was embossed with fine lines (to remove air) and then placed between 12 inch by 12 inch glass plates. The assemblies were heated for 30 minutes at 300° F. under vacuum and then heated in an autoclave at 275° F. and 200 p.s.i. for 45 minutes. The laminate obtained was clear with a slight haziness and had properties comparable to those of the product of Example 1.

Example 3

Example 2 was repeated using a resin of the following composition:

| | Parts by weight |
|---|---|
| Prepolymer A | 824.6 |
| Toluene diisocyanate | 175.4 |
| 1,4-Butanediol | 130.7 |
| Trimethylol propane | 7.7 |
| 2-Hydroxyethyl acrylate | 20.0 |
| Di(t-butyl) peroxide | 0.2 |

The product obtained had similar properties to that of Example 2.

Examples 4–6

Following the procedure of Example 1, several laminates were made utilizing resins of varying composition. The laminates had an interlayer about 30 mils thick. The data are shown below:

| Example | 4 | 5 | 6 |
|---|---|---|---|
| Prepolymer: | | | |
| A | 397.4 | 256.8 | 494.8 |
| B | | 256.8 | |
| Toluene diisocyanate | 102.6 | 86.4 | 105.2 |
| 1,4-butanediol | 66.2 | 83.1 | 87.4 |
| Trimethylolpropane | 4.0 | | |
| Trimethylolpropane monoallyl ether | 8.9 | | |
| 2-hydroxyethyl acrylate | | 12.0 | |
| 2-hydroxypropyl acrylate | | | 10.3 |
| 2-hydroxyethyl methacrylate | 22.9 | | |
| Subs. benzotriazole (U.V. absorber) | 0.6 | 0.6 | 0.6 |
| Methyl acid prosphate | 0.5 | 0.6 | 0.6 |
| Di(t-butyl) peroxide | 1.5 | 0.12 | 0.09 |
| Impact resistance: | | | |
| (0° F.), ft | 5 | 2½ | 5 |
| (120° F.), ft | 8 | 12 | 7 |

Example 7

Example 1 was repeated using the following:

| | |
|---|---|
| Prepolymer A | 247.4 |
| Pepolymer C | 245.2 |
| Toluene diisocyanate | 77.4 |
| 1,4-Butanediol | 84.0 |
| 2-Hydroxyethyl acrylate | 12.0 |
| Methyl acid phosphate | 0.6 |
| Di(t-butyl) peroxide | 0.12 |

Prepolymer C was produced by reacting 652.5 parts of toluene diisocyanate with 1280 parts of polypropylene glycol having an average molecular weight of 1025. The laminate obtained was suitable for some purposes but its properties were somewhat inefrior to those above.

Example 8

Following the procedure of Example 1, a laminate was produced using the following:

| | Parts by Weight |
|---|---|
| Prepolymer A | 495 |
| Toluene diisocyanate | 105 |
| 2-Hydroxypropyl propionate | 6.5 |
| 1,4-Butanediol | 84.4 |
| 2-Hydroxypropyl acrylate | 8.0 |
| Di(t-butyl) peroxide | 0.008 |

A clear useful laminate was obtained; however, its strength was below that of Example 1.

Example 9

In this example there was employed a polyester glycol prepared from 2 moles of maleic anhydride, 3 moles of neopentyl glycol and 1 mole of acrylic acid. The following were employed to produce B-stage polyurethanes (materials in parts by weight):

| | A | B | C |
|---|---|---|---|
| Polyester glycol | 20 | 20 | 20 |
| Toluene diisocyanate | 5 | 3 | 10 |
| Butyl acrylate | 2 | 1 | 3 |
| 1,4-butanediol | 10 | 10 | 10 |

The reactions were carried out by heating a mixture of the polyester glycol and toluene diisocyanate in butyl acrylate in the presence of a trace of dibutyl tin diacetate for 4 hours at 200° F., then adding the 1,4-butanediol and allowing the mixture to stand at room temperature overnight. The B-stage products obtained had essentially no unreacted —NCO groups and were clear, viscous yellowish liquids. Each was cured by adding 20 percent by weight of benzoyl peroxide and heating at 200° F. for 30 minutes. The cured products were clear, hard and strong, although brown in color.

Example 10

In this example there was employed an acrylyl-terminated ester produced from phthalic anhydride, 2-hydroxyethyl acrylate and ethylene oxide and having the formula

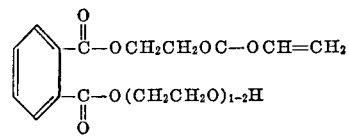

A mixture of 52 parts of the above ester, 18.3 parts of toluene diisocyanate and 34.7 parts of polyester polyol (made from 1 mole of adipic acid, 1.1 mole of neopentyl glycol and 0.02 mole of trimethylolpropane), in 26.6 parts of butyl acrylate, were reacted as above to produce a B-stage polyurethane, which was cured by the addition of 2 percent by weight of benzoyl peroxide and heating at 200° F. for 15 minutes.

Example 11

One mole of the diglycidyl ether of Bisphenol A (Epon 828) was reacted with 2 moles of acrylic acid to give an acrylyl-terminated ester, which was dissolved in a 3 to 1 ratio of butyl acrylate and triethylene glycol at 80 percent solids. A mixture of 12 parts of this solution and 11.3 parts of toluene diisocyanate in 7.5 parts of butyl acrylate were reacted to form a B-stage polyurethane which was curable to a hard thermoset state in 1 hour at 200° F. in the presence of 0.1 percent by weight of benzoyl peroxide.

According to the provisions of the patent statutes, there are described above the invention and what are now condidered to be its best embodiments. However, within the scope of the appeded claims, it is to be understood that the invention can be practiced otherwise than as specifically described.

I claim:

1. A method of producing a glass laminate which comprises the steps of:
   (A) admixing one or more hydroxyl containing esters having a terminal acrylyl group or alpha-substituted acrylyl group, an organic diisocyanate, and a polyol to produce a curable, substantially linear B-stage polyurethane resin corresponding to the average formula:

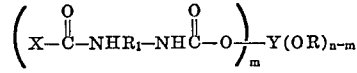

where X is an organic radical formed by removing a hydroxyl hydrogen atom from an ester containing a terminal acrylyl or alpha-substituted acrylyl group and at least one hydroxyl group, $R_1$ is a divalent organic radical, R is hydrogen or an organic group containing urethane linkages, Y is a radical derived by removing the hydroxyl groups from a polyol having $n$ hydroxyl groups, $n$ is a number greater than 1 and up to about 8, and $m$ is a number greater than 1 and up to about 4, wherein said B-stage polyurethane, while being curable to a hard thermoset state by addition polymerization, is essentially thermoplastic;

(B) applying said B-stage polyurethane to a surface of at least one sheet of glass; and (C) curing the applied B-stage polyurethane by addition polymerization.

2. The method of Claim 1 in which said B-stage polyurethane is in sheet form.

3. The method of Claim 1 in which said polyurethane is cured by heating in the presence of a free-radical initiator.

4. The method of Claim 3 in which said free-radical initiator is an organic peroxide.

5. The method of Claim 1 in which said polyurethane is cured by irradiation with an electron beam or ultraviolet light.

References Cited

UNITED STATES PATENTS

| | | | |
|---|---|---|---|
| 3,522,142 | 7/1970 | Wismer et al. | 161—190 |
| 3,297,745 | 1/1967 | Fekete et al. | 260—471 |
| 3,425,988 | 2/1969 | Gorman | 260—47 |
| 3,539,424 | 11/1970 | Tashlick | 156—238 |
| 3,330,713 | 7/1967 | Watson et al. | 156—244 |
| 3,697,622 | 10/1972 | Kehr et al. | 260—858 |
| 3,458,388 | 7/1969 | Moynihan | 161—65 |
| 3,422,165 | 1/1969 | Brotherton et al. | 260—859 |
| 3,711,364 | 1/1973 | Ahramjian | 156—99 |
| 3,580,796 | 5/1971 | Hick, Jr. et al. | 161—190 |

DANIEL J. FRITSCH, Primary Examiner

U.S. Cl. X.R.

156—106, 272, 331; 161—190